United States Patent [19]

Schelling et al.

[11] Patent Number: 5,555,056
[45] Date of Patent: Sep. 10, 1996

[54] CAMERA WITH MANUAL REWIND APPARATUS

[75] Inventors: Anna C. Schelling, Geneva; Stanley W. Stephenson, III, Spencerport, both of N.Y.

[73] Assignee: Eastman Kodak Company, Rochester, N.Y.

[21] Appl. No.: 445,440

[22] Filed: May 19, 1995

[51] Int. Cl.$^6$ ..................................................... G03B 1/00
[52] U.S. Cl. ........................... 354/212; 354/214; 242/350
[58] Field of Search ................................. 354/212, 214; 242/350; 74/547

[56] References Cited

U.S. PATENT DOCUMENTS

| | | | |
|---|---|---|---|
| 1,999,457 | 4/1935 | Hoehn | 74/547 |
| 2,140,445 | 12/1938 | Mihalyi | 354/214 |
| 2,912,181 | 11/1959 | Suzukawa | 242/350 |
| 3,005,599 | 10/1961 | Padelt | 242/350 |
| 3,014,673 | 12/1961 | Lange | 242/350 |
| 3,061,222 | 10/1962 | Beach | 242/350 |
| 3,097,809 | 7/1963 | Gunther | 242/350 |

FOREIGN PATENT DOCUMENTS 56-28580   7/1981   Japan .

*Primary Examiner*—Michael L. Gellner
*Assistant Examiner*—Eddie C. Lee
*Attorney, Agent, or Firm*—Peter J. Bilinski

[57] ABSTRACT

A photographic camera has manual rewind apparatus including a rotatable driver connectable with a film spool, and a storable crank pivotally mounted on a hub and engageable with the driver for turning the driver in a rewind direction. The crank cams out of engagement with the driver upon reverse rotation. The crank has a handle that enters a recess when the crank is pivoted to a stored position. The handle may be engageable with a shutter release pin located in the recess to release the camera shutter upon manual depression of the rewind crank when stored.

10 Claims, 3 Drawing Sheets

CAMERA WITH MANUAL REWIND APPARATUS

FIELD OF THE INVENTION

This invention relates to photographic cameras with manual film transport means and in particular to film rewind apparatus.

BACKGROUND OF THE INVENTION

It is known in the art to provide a camera with a film cartridge or cassette in which the film is initially thrust out of the cassette by rotation of an internal film spool. Upon film rewind, the film spool may be turned to a specified position that indicates the exposed condition of the film.

In applying a manual film rewind mechanism or apparatus to such a camera, it is important that the rewind apparatus have a unique or single phase relation connection with the cassette film spool and/or that an external indicator be provided on the camera to locate the film spool in the unique position after rewind. Flush mounting of the rewind actuator is preferable for a clean camera design. Stationary storage and alternative use of a stored rewind crank could also contribute to a clean design.

SUMMARY OF THE INVENTION

The present invention provides a manual film rewind apparatus which meets these goals. It provides a rewind crank which may be stored in a non-rotational position during camera operation, except during the film rewind. In addition, the apparatus may be arranged for driving connection of the crank with the film spool at only one specific phase relation to aid positioning of the spool after rewind. Preferably, the crank may be mounted flush with the camera body in its stored position. Use of the stored crank to actuate a shutter release pin may also be provided.

These and other features and advantages of the invention will be more fully understood from the following detailed description of the invention taken together with the accompanying drawings.

DETAILED DESCRIPTION OF THE INVENTION

Figure 1:
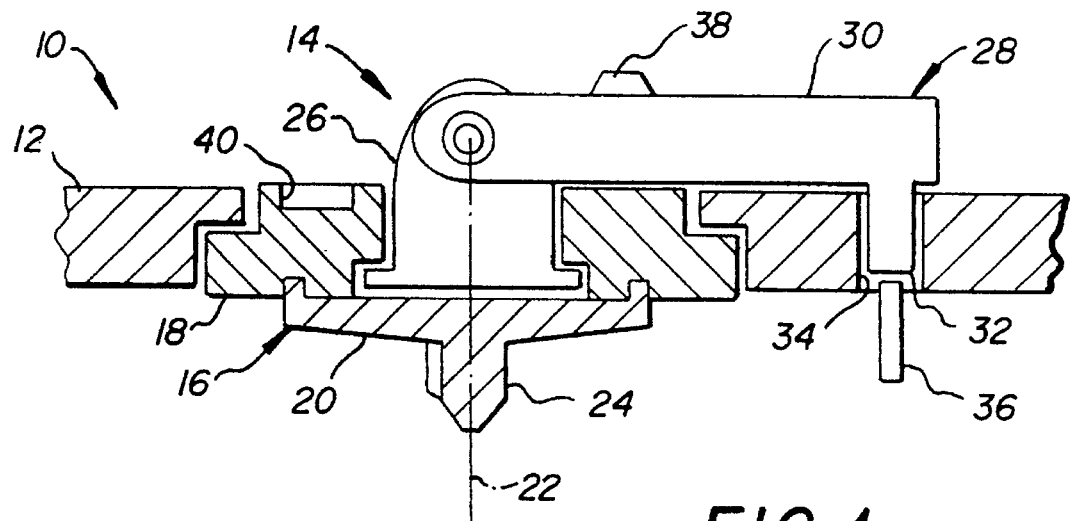
FIG. 1 is a cross-sectional view of a first embodiment of rewind apparatus formed in accordance with the invention and shown in the stored position.
Figure 2:
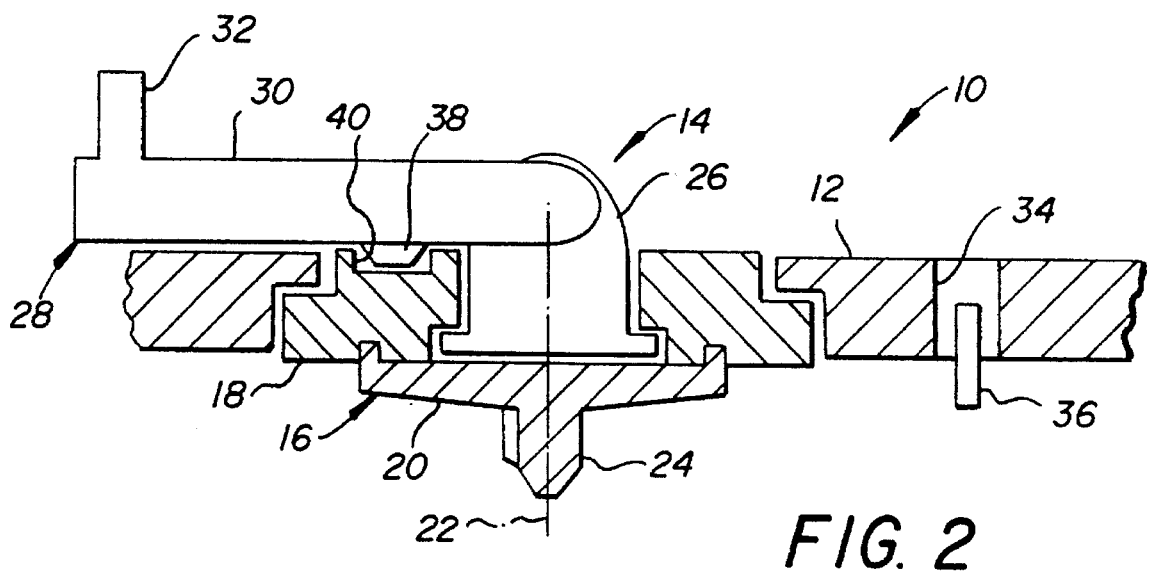
FIG. 2 is a view similar to FIG. 1 but showing the apparatus in the film rewind position.
Figure 3:
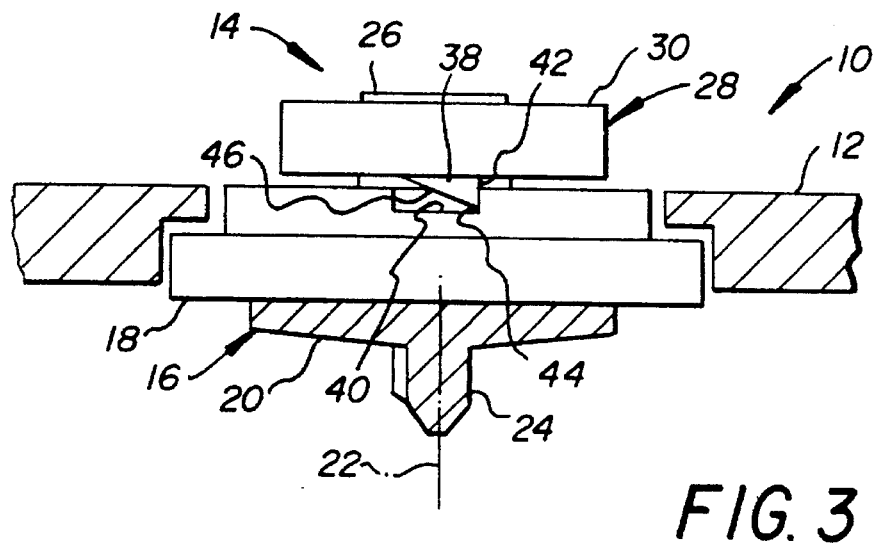
FIG. 3 is a cross-sectional view from the line 3—3 of FIG. 2 and showing the one way drive feature.

Referring now to FIGS. 1–3 of the drawings in detail, numeral 10 generally indicates a photographic camera having a body 12 in which there is mounted a manual rewind apparatus generally indicated by numeral 14. Apparatus 14 includes a rotatable spool driver assembly 16 that includes a connector ring 18 rotatable in the camera body 12. An attachment disk 20 is fixed to the ring 18 and rotatable therewith on a common axis 22. Disk 20 includes an axially extending drive lug 24 which is keyed for engagement in only one position with a film spool rotatably carried in a film cassette, not shown, within the camera body.

The rewind apparatus further includes a crank hub 26 that is carried by the spool driver 16 for free rotation therein around the axis 22. The hub 26 carries a rewind crank 28 that includes a rewind lever 30 pivotally connected with the support member 26 along the axis 22 and a dowel-like rewind handle 32 extending laterally from the outer end of the lever 30. When the crank is in the stored position shown in FIG. 1, the handle 32 extends into a recess 34 of the camera body. A shutter release pin 36 also extends into the recess 34, in position to actuate a camera shutter not shown, to be operatively engaged by the rewind handle 32 when the rewind lever 30 is manually depressed.

The rewind lever 30 also has a raised lug 38 positioned to coact with a recess 40, formed in the outer surface of the connector ring 18, when the rewind lever is in the rewind position shown in FIGS. 2 and 3. The lug 38 includes a vertical or upstanding face or abutment 42 which is engageable with a corresponding vertical wall or abutment 44 of the recess 40 as shown in FIG. 3. The opposite side of the lug is preferably formed as a sloping cam face 46.

In operation, when a cassette is installed in the camera, the internal film spool engages the keyed drive lug 24 in a single position so that the film spool and the spool driver assembly 16 are continuously related with a predetermined phase angle relation. If necessary, the rewind handle may be used to rotate the spool driver assembly until it is properly positioned for engagement with the film spool within the cassette. The rewind crank 28 is then moved to the stored position of FIG. 1.

In the stored position, the film may be advanced since the connector ring 18 is free to rotate with the film spool while the! crank remains stored with its handle 32 received within the recess 34. When the film is advanced to the first photo location, the shutter release pin will extend upward to the position shown in FIG. 2, raising the rewind lever 30 slightly. Thereafter, forcing of the rewind lever downward will cause the handle 32 to trip the shutter release pin and actuate the camera shutter, not shown.

When the film has been fully exposed, the rewind crank 28 is deployed in the position shown in FIGS. 2 and 3 with the lug 38 received within the recess 40. Rotation of the crank counterclockwise as viewed from above, or downward as shown in the figures, will cause the engaging abutments 42, 44, of the lug and recess respectively, to transmit torque between the crank 28 and the driver assembly 16, moving the film in a rewind direction. If the crank is rotated in a clockwise direction, the sloping cam face 46 of the lug 38 will detach it from the recess 40 and cause the crank to ride over the surface of the connector ring 18. This will prevent the rewind crank from driving the film spool in the film advance direction which might damage the film within the camera.

Some film cassettes provide for parking of a rewound film spool in a predetermined location indicated on the cassette, which tells the film processor that the film has been exposed. This may be accomplished in the embodiment of FIGS. 1–3, for example, by moving the rewind lever in the rewind direction until it is properly positioned for pivoting to the stored position. At this point, the apparatus will have positioned the internal film spool in the desired position for indicating that the film is exposed, so the rewind handle may then be stored and the film cassette be removed from the camera. Alternatively, the camera body and/or rotatable portions of the rewind apparatus may be provided with indicia indicating the location at which the crank rotation should be stopped to park the film spool in the rewind position.

Figure 4:
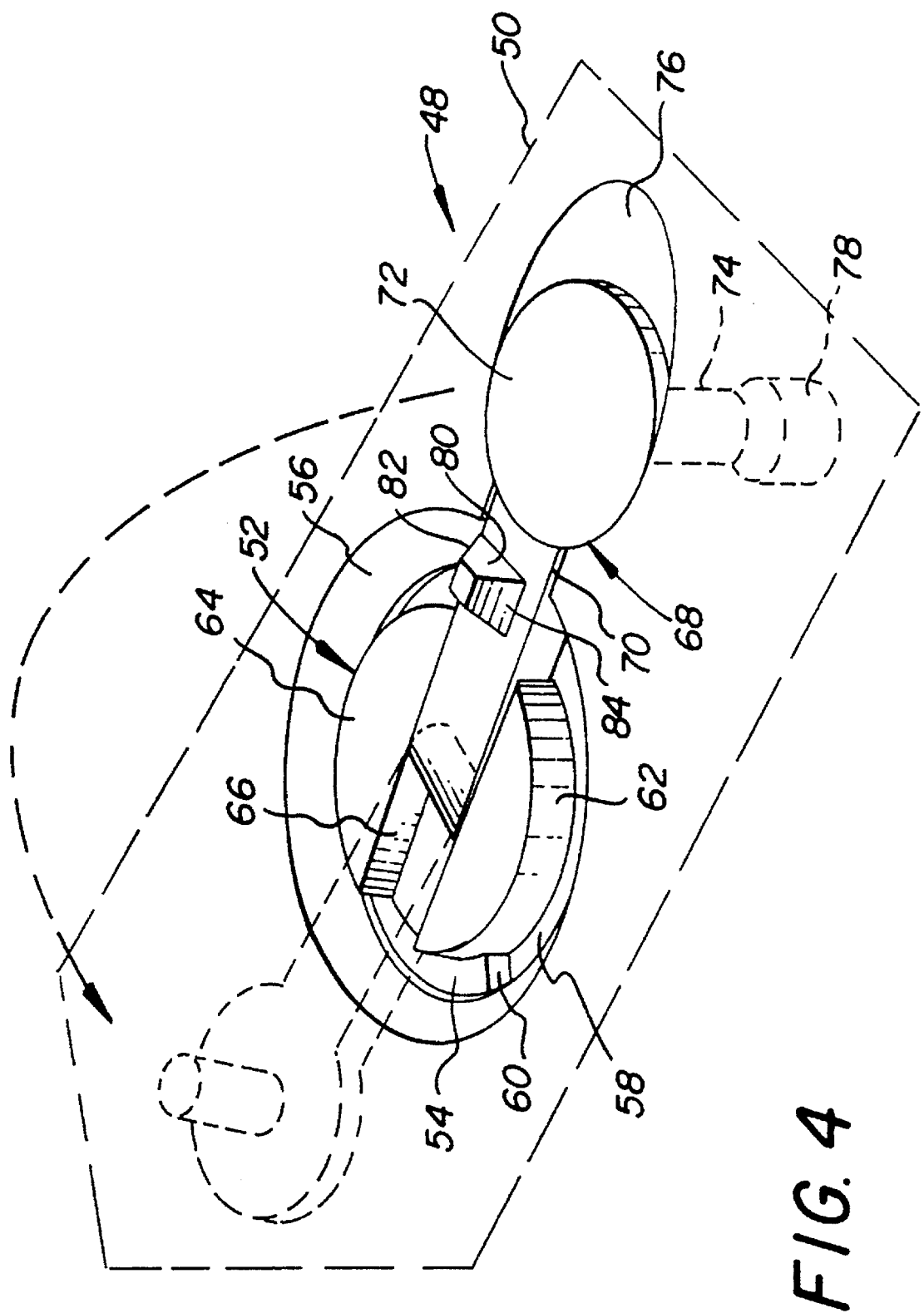
FIG. 4 is a pictorial view of an alternative embodiment of manual rewind mechanism according to the invention.
Figure 5:
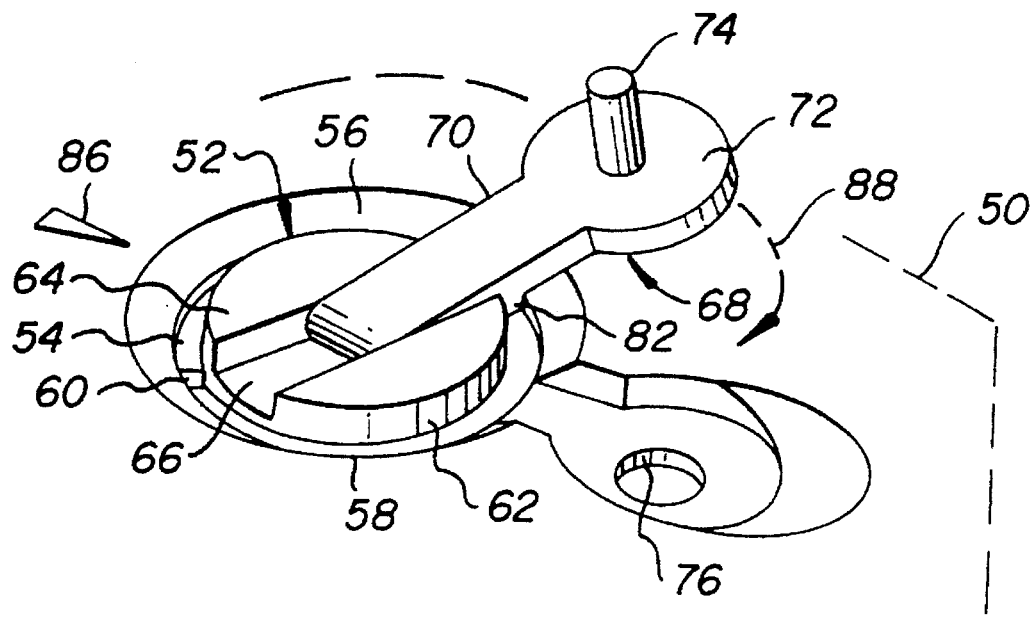
FIG. 5 is a pictorial view showing the crank of the rewind mechanism of FIG. 4 in a raised position.
Figure 6:
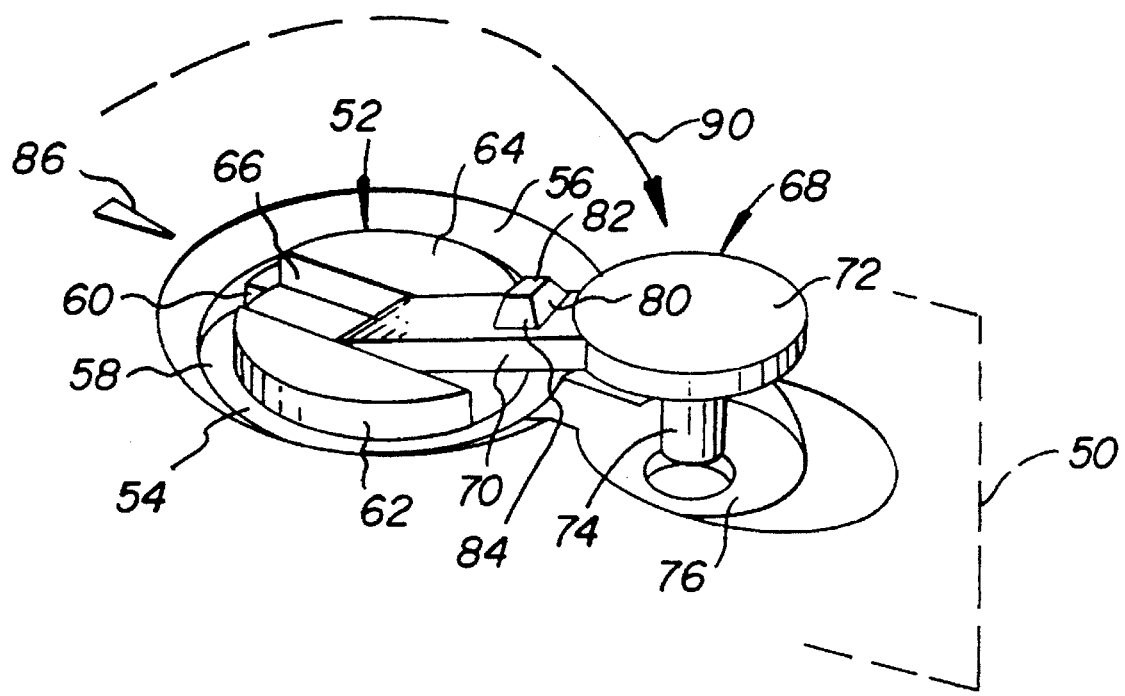
FIG. 6 is a pictorial view showing the mechanism of FIGS. 4 and 5 being moved into the stored position.

Referring now to FIGS. 4–6, there is shown a camera generally indicated by numeral 48. Camera 48 includes a body 50 mounting an alternative embodiment of manual film rewind apparatus generally indicated by numeral 52. Apparatus 52 includes a spool driver 54 having a drive lug, not shown, generally similar to that of the first described embodiment. The driver 54 is mounted within a recessed portion 56 of the camera body and defines an annular recess or socket 58 having a raised abutment 60.

Rotatably mounted within the driver 54 is a rewind hub 62 having an outer surface 64 that is flush with the adjacent outer surface of the camera body 50. A mounting slot 66 extends across the top of the hub 62. Slot 66 receives a rewind crank 68 including a rewind lever 70 pivotally connected at one end within the slot 66. At its other end, the rewind lever 70 has a circular portion from which a dowel-like rewind handle 74 extends laterally.

In the stored position, shown in solid lines in FIG. 4, the handle 74 extends into a recess 76 of the camera body. The recess 76 is enlarged near the surface for receiving the circular portion 72 of the lever 70 when the rewind crank is in a stored position as shown in FIG. 4. The recess 76 also extends to the side of the circular portion as shown to provide room for grasping the edge of the circular portion to move the crank 68 out of the stored position. Recess 76 also includes a slot portion for receiving a portion of the rewind lever adjacent the circular portion and allowing the complete lever to be mounted flush with the outer surface of the camera body when in the stored position. As in the previous embodiment, the handle 74 is engageable with a shutter release pin 78 when the crank is in the stored position.

A drive lug 80 extends upward from the back of the rewind lever 70 when the crank is in the stored position. Lug 80 includes a vertical face or abutment 82 that is adapted to engage abutment 60 of the spool driver when the crank is in the rewind position and is rotated clockwise. A cam face 84 is provided on the side opposite abutment 82. As shown in FIGS. 5 and 6, the camera case is provided with indicia in the form of an arrow 86 to indicate the alignment position of the rewind crank 68 for locating it in the position for storage as well as providing alignment of the internal cassette in its position to indicate that it is exposed. It should be readily apparent that the alignment position of the rewind crank 68 can be indicated in a number of alternate ways. For example, a single detent (not shown) can be added to the outer wall of the connector ring 18 for engaging the camera body 12 in lieu of arrow 86 to provide a tactile rather than a visual indicator.

Operation of the embodiment of FIGS. 4–6 is essentially the same as that for the first described embodiment. FIG. 4 shows the apparatus with the rewind crank 68 in the stored position in solid lines and in the rewind position in dashed lines. FIG. 5 shows the crank moved into the rewind position wherein turning the crank clockwise, as shown by the arrow 88, will move the lug abutment 82 into engagement with abutment 60 of the spool driver 54 and rotate the driver clockwise in the rewind direction. FIG. 6 illustrates the apparatus with the spool driver 54 in the crank storage position and the crank 68 being moved in the direction of arrow 90 toward its stored position in the recess 76.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

| Parts List | |
|---|---|
| 10. | camera |
| 12. | body |
| 14. | manual film rewind apparatus |
| 16. | spool driver assembly |
| 18. | connector ring |
| 20. | attachment disk |
| 22. | axis |
| 24. | drive lug |
| 26. | crank hub |
| 28. | crank |
| 30. | rewind lever |
| 32. | rewind handle |
| 34. | recess |
| 36. | shutter release pin |
| 38. | raised lug |
| 40. | recess |
| 42. | face or abutment |
| 44. | wall or abutment |
| 46. | cam face |
| 48. | camera |
| 50. | body |
| 52. | manual film rewind apparatus |
| 54. | spool driver |
| 56. | recessed portion |
| 58. | recess or socket |
| 60. | abutment |
| 62. | rewind hub |
| 64. | outer surface |
| 66. | slot |
| 68. | rewind crank |
| 70. | rewind lever |
| 72. | circular portion |
| 74. | handle |
| 76. | recess |
| 78. | shutter release pin |
| 80. | drive lug |
| 82. | face or abutment |
| 84. | cam face |
| 86. | arrow |
| 88. | arrow |
| 90. | arrow |

What is claimed is:

1. A camera having manual film rewind apparatus including a rotatable driver connectable with a film spool, and a pivotally mounted storable rewind crank rotatable with said driver for turning the driver in a rewind direction, said apparatus characterized by:

a rewind crank support carried for rotation on a common axis with said driver and pivotally mounting said rewind crank; and an abutment on at least one of the crank and the driver and directly engageable with the other when the crank is in a driving position for transmitting rewind rotation from the crank to the driver;

the crank being pivotally movable into a stored position wherein the crank is non-rotatably stored and the driver is disengaged from the crank and freely rotatable with an associated film spool.

2. The invention as in claim 1 characterized in that said driver is rotatably mounted in a body of said camera and said support is rotatably mounted in said driver.

3. The invention as in claim 2 characterized in that said crank carries a protrusion receivable in a rewind recess in said driver when the crank is pivoted to the driving position, said abutment being located on at least one of the protrusion and rewind recess.

4. The invention as in claim 3 characterized in that at least one of said protrusion and rewind recess has a sloping cam surface engageable by the other upon reverse rotation of the rewind crank to cam the protrusion out of engagement with the rewind recess and prevent reverse rotation of the spool by the crank.

5. The invention as in claim 4 characterized in that at least one of said camera body, said driver, said support and said crank includes indicia for indicating a prescribed angular position of an associated film spool.

6. The invention as in claim 2 characterized in that said crank includes a lever pivotally mounted to said support and a handle extending laterally from the lever, said body including a storage recess receiving the handle when the crank is in the stored position and allowing the lever to lie generally along the camera body.

7. The invention as in claim 6 characterized by a shutter release pin for controlling actuation of a shutter in the camera, the release pin extending into the storage recess and being engageable by said handle when the crank is in its stored position such that depression of the crank will depress the pin to actuate the shutter.

8. The invention as in claim 7 characterized in that said lever carries a protrusion receivable in a rewind recess in said driver when the crank is pivoted to the driving position, said abutment being located on at least one of the protrusion and rewind recess.

9. The invention as in claim 8 characterized in that at least one of said protrusion and rewind recess has a sloping cam surface engageable by the other upon reverse rotation of the rewind crank to cam the protrusion out of engagement with the rewind recess and prevent reverse rotation of the spool by the crank.

10. The invention as in claim 9 characterized in that at least one of said camera body, said driver, said support and said crank includes indicia for indicating a prescribed angular position of an associated film spool.

* * * * *